US009068338B2

(12) United States Patent
Padgett, Jr.

(10) Patent No.: US 9,068,338 B2
(45) Date of Patent: Jun. 30, 2015

(54) LIFT STATION FLOW DIVERTER AND METHOD OF USING SAME

(75) Inventor: Gary C. Padgett, Jr., Mooresville, IN (US)

(73) Assignee: GP Hydraflow, LLC, Mooresville, IN (US)

( * ) Notice: Subject to any disclaimer, the term of this patent is extended or adjusted under 35 U.S.C. 154(b) by 850 days.

(21) Appl. No.: 13/238,938

(22) Filed: Sep. 21, 2011

(65) Prior Publication Data

US 2013/0068308 A1    Mar. 21, 2013

(51) Int. Cl.
| | |
|---|---|
| *E03F 1/00* | (2006.01) |
| *E03F 5/22* | (2006.01) |
| *F16L 3/01* | (2006.01) |
| *F17D 1/00* | (2006.01) |
| *C02F 103/00* | (2006.01) |

(52) U.S. Cl.
CPC .............. *E03F 5/22* (2013.01); *Y10T 137/8593* (2015.04); *Y10T 137/0318* (2015.01); *E03F 1/00* (2013.01); *C02F 2103/001* (2013.01); *F16L 3/01* (2013.01); *F17D 1/00* (2013.01)

(58) Field of Classification Search
CPC ......... E03F 5/22; E03F 1/00; C02F 2103/001
USPC ....... 137/363, 592, 812, 561 R, 236.1; 52/20; 210/512.1, 787, 788
See application file for complete search history.

(56) References Cited

U.S. PATENT DOCUMENTS

| | | | |
|---|---|---|---|
| 3,915,593 | A | 10/1975 | Chamberlain |
| 4,487,692 | A | 12/1984 | Kersten |
| 4,529,359 | A * | 7/1985 | Sloan .............................. 417/34 |
| 5,553,973 | A | 9/1996 | Duran |
| 6,074,130 | A * | 6/2000 | Duran ............................ 405/53 |
| 6,109,778 | A * | 8/2000 | Wilmer ......................... 366/137 |
| 6,117,340 | A * | 9/2000 | Carstens ....................... 210/788 |
| 6,135,141 | A * | 10/2000 | Bombach ...................... 137/363 |
| 6,868,857 | B2 | 3/2005 | McCasker |
| 7,811,450 | B2 * | 10/2010 | Persson .................... 210/170.03 |
| 2004/0050407 | A1 | 3/2004 | Jones |
| 2004/0251350 | A1 | 12/2004 | Bratten |
| 2007/0051674 | A1 | 3/2007 | Bratten |
| 2007/0267342 | A1 * | 11/2007 | Cobb et al. ................. 210/512.1 |
| 2008/0169239 | A1 | 7/2008 | Sparks et al. |
| 2010/0176054 | A1 | 7/2010 | Koopmans et al. |
| 2011/0068060 | A1 | 3/2011 | Hatten |

OTHER PUBLICATIONS

Anue Water Technologies EP-1300 Brochure.
Lift Station Maintenance for the Complete Idiot.

* cited by examiner

*Primary Examiner* — Atif Chaudry
(74) *Attorney, Agent, or Firm* — Taft Stettinius & Hollister LLP; Stephen F. Rost

(57) ABSTRACT

An apparatus for diverting the flow of wastewater in a lift station, or other liquid storage tank, along the interior wall of the station. In particular, wastewater introduced into a lift station by an inlet is directed by piping so it is discharged along the interior wall to impart a generally circular or vortex-like movement of the wastewater in the station. This generally circular or vortex-like movement prevents coagulation of solids not removed from the station by the pumps therein, reducing the need for cleaning and other maintenance of the lift station.

20 Claims, 4 Drawing Sheets

LIFT STATION FLOW DIVERTER AND METHOD OF USING SAME

FIELD OF THE INVENTION

The present disclosure relates to sewage systems and, more particularly, to a device and method for directing the flow of wastewater within a lift station or other liquid storage tank.

BACKGROUND

The importance of efficient sewage systems to modern society is well-known. When such a system is not functioning properly, one does not have to be an expert in civil engineering to notice. Much of a typical sewage system relies on a downward, gravity-driven flow to convey wastewater, which includes sewage; however, because the terrain covered by the system is not completely level, the wastewater sometimes needs to be pumped uphill in order to reach a processing point.

Lift stations are used to effect the conveyance of the wastewater from a lower elevation to higher elevation. Lift stations are particularly useful where an attempt to apply a gravity flow conveyance would result in excessive excavation and construction costs. Moreover, at the lift station, water is separated from the solids in the wastewater. Accordingly, lift stations are a vital component of a sewage system, and a large urban area's system may utilize hundreds of lift stations.

Lift stations are typically in-ground cylinders, ranging from six to twenty-four feet in diameter and ten to thirty-five feet in depth. Components of a lift station include one or more inlet lines, through which the wastewater enters the station; an outlet line, through which the wastewater exits the station; one or more submerged pumps to force the flow of the wastewater through the outlet line; and a float that activates the pump, in a manner similar to a toilet. More specifically, the pumps activate when the wastewater in the station reaches a predetermined level, and they pump the wastewater to the outlet, which is often at a higher elevation than the inlets. Switches turn the pumps off when the wastewater has been pumped below a predetermined level, usually a level just above the pumps.

Many lift stations have no interior pipes connected to the inlets, so the entering wastewater simply falls downward into the central portion of the station and splashes into the wastewater already there. Other lift stations may have a pipe inside the station that carries entering wastewater to a point below the water level, so the wastewater is merely directed toward inlets on the pumps.

When it comes to maintenance, lift stations require manual cleaning, which is a considerable investment of both time and money. This is due, in no small part, to the fact that wastewater includes many solids that float on the surface of the water in the lift station. Such solids may include human and animal waste, toilet paper, hair, and grease, among other materials. Because the pumps turn off before the top of the wastewater (and, hence, the floating solids) reaches the pump, not all solids are pumped out of the lift station.

Solids, then, tend to accumulate toward the bottom of the stations, and their removal is difficult due to the considerable depth of the stations. Not only is such an accretion unpleasant in odor and appearance, but the buildup of solid waste in a lift station can lead to the emission of the very poisonous hydrogen sulfide ($H_2S$) gas. Hydrogen sulfide gas often results from the bacterial breakdown of organic matter in the absence of oxygen. Additionally, lift station walls may corrode if not regularly cleaned.

SUMMARY OF THE INVENTION

The present invention may comprise one or more of the following features and combinations thereof.

An illustrative apparatus includes one or more pipes, with at least one generally vertical section and at least one generally non-vertical section, that direct wastewater from lift station inlets and are configured to discharge the wastewater along the interior wall of the lift station. This discharge direction causes most of the wastewater in the lift station to flow in a generally circular or vortex-like direction. Significantly, because the water is moving, the solids in the lift station are also moving, which reduces their tendency to separate from the water, float, and eventually coagulate. The increased mixing of the solids with the moving wastewater allows more of the solids to be pumped out of the lift station, which reduces the build-up of solids in the lift station and its need for periodic cleaning as well as the chances of the wastewater freezing. The release of hydrogen sulfide ($H_2S$) gas is also thereby minimized due to the considerable reduction of solid buildup.

In one illustrative embodiment, a basin is positioned below an inlet in a lift station. The basin has an aperture in its bottom and a sloped interior capable of directing the flow of wastewater toward the aperture. Alternatively, a pipe for receiving wastewater may be directly connected to the lift station inlet. One or more swivels may be used in the piping to allow rotation around an axis created by the vertical section of piping. Also, an adapter may be applied to the end of the piping to modify the force by which the wastewater is discharged along the wall of the lift station. Advantageously, the apparatus may be easily retrofitted to existing lift stations.

Use of the apparatus disclosed herein allows for an effective method for minimizing the need for cleaning and maintenance of a lift station's interior. Although an illustrative embodiment is configured for sewer system lift stations, other embodiments may be applied to any sort of liquid storage tank.

Additional features of the disclosure will become apparent to individuals skilled in the art upon consideration of the following detailed description of the illustrative embodiment.

BRIEF DESCRIPTION OF THE DRAWINGS

The detailed description particularly refers to the accompanying figures in which.

DETAILED DESCRIPTION OF THE ILLUSTRATIVE EMBODIMENTS

Figure 1:
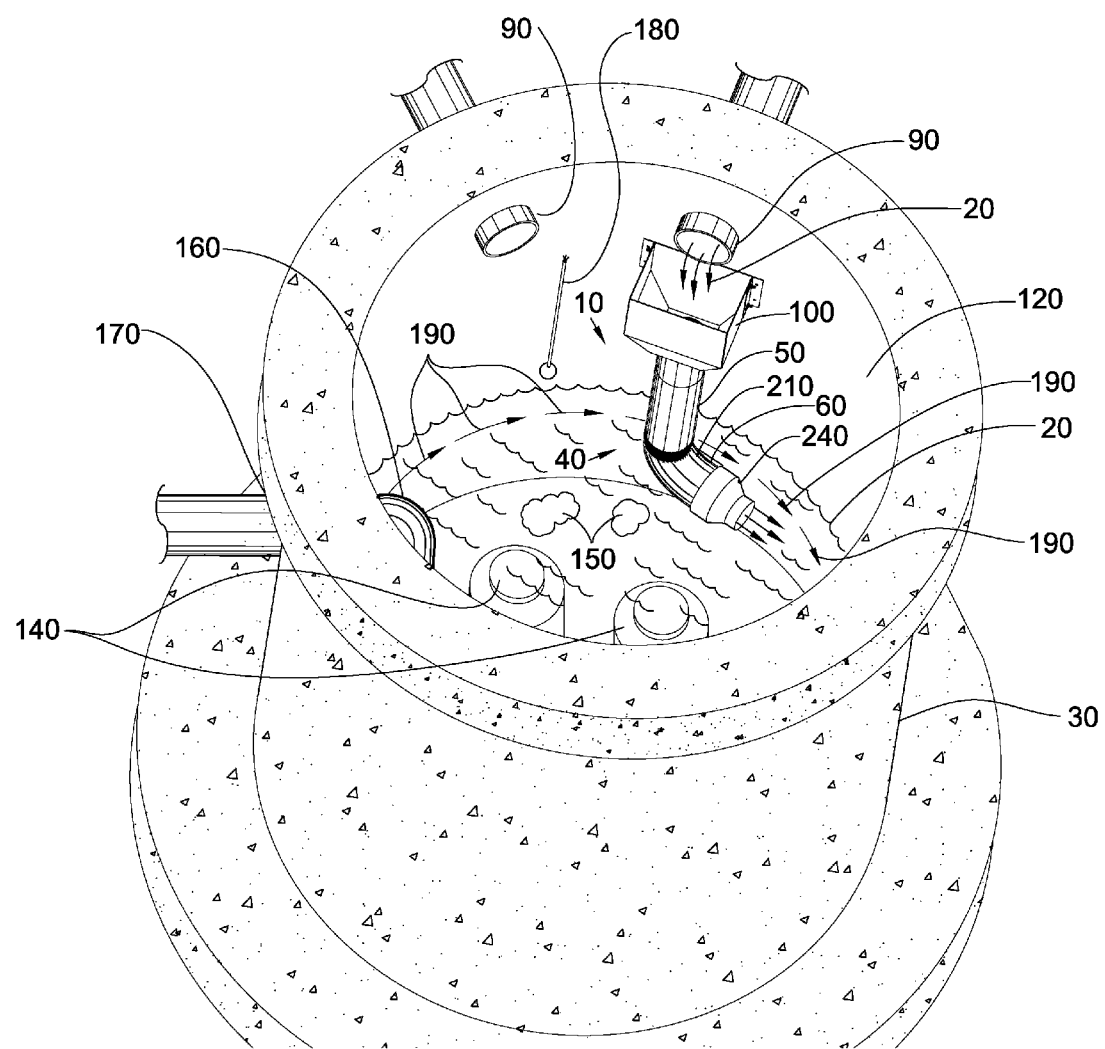
FIG. 1 is a perspective view of a first illustrative embodiment of an apparatus for diverting the flow of wastewater in a lift station.

For the purposes of promoting and understanding the principles of the invention, reference will now be made to one or more embodiments illustrated in the drawings and specific language will be used to describe the same.

Figure 2:
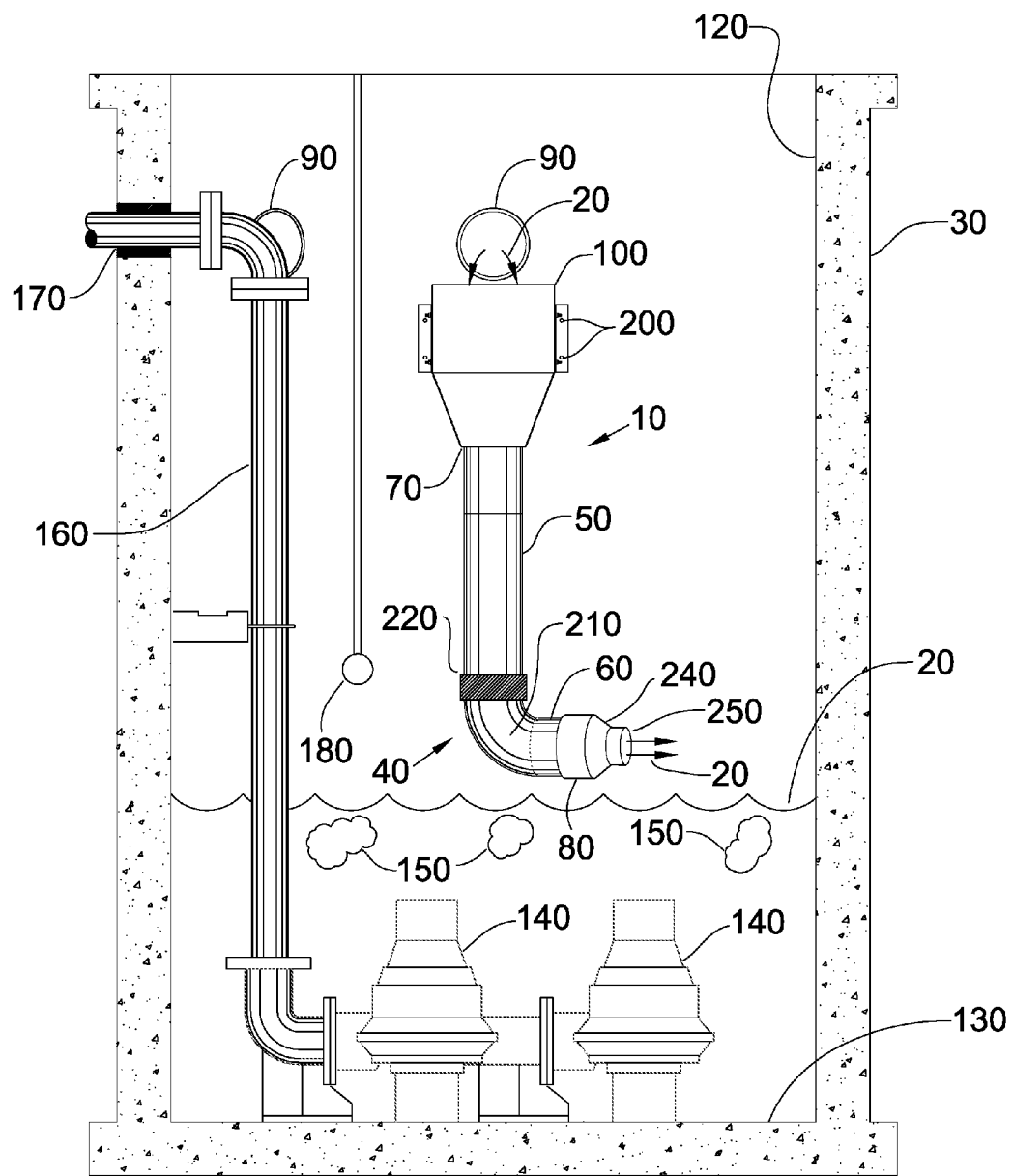
FIG. 2 is a front view of the apparatus of FIG. 1 within a lift station.
Figure 3:
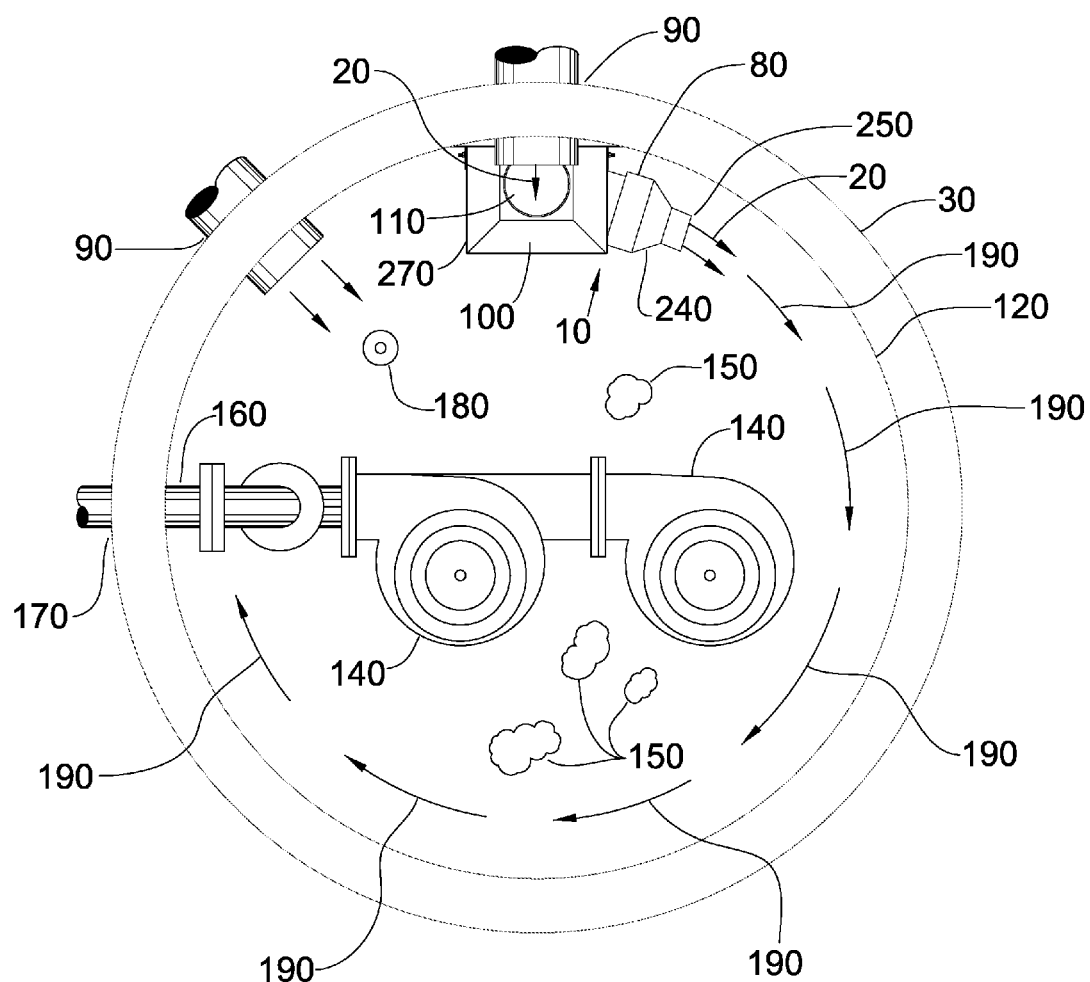
FIG. 3 is a top view of the apparatus of FIG. 1 within a lift station.

Referring to FIGS. 1 through 3, an illustrative apparatus 10 for diverting the flow of wastewater 20 in a lift station 30 is shown. The apparatus 10 comprises piping 40 with at least one generally vertical section 50 and at least one generally non-vertical section 60. The piping 40 includes an input end 70 for receiving the wastewater 20 and a discharge end 80 at the end of the non-vertical section 60. The input end 70 is configured to receive the wastewater 20 from an inlet 90 in the lift station 30. In one embodiment, the input end 70 includes a basin 100 for receiving the wastewater 20 and is positioned below the inlet 90. The basin 100 has an aperture 110 through which the wastewater 20 passes into the piping 40. Alternatively, the input end 70 may be directly coupled to an inlet 90. Additionally, the input end 70 may be configured, by means such as an enlarged basin 100 or additional piping, to receive wastewater 20 from multiple inlets 90 in the lift station 30. While, in some embodiments of the present invention, the lift station 30 may have multiple inlets 90, each inlet 90 need not utilize an apparatus 10.

The lift station 30 has an interior wall 120, a base 130, and one or more pumps 140 for forcing wastewater 20, including solids 150 and other wastewater 20 elements, out of the lift station 30 via discharge lines 160 connected to one or more outlets 170 for processing at a point further along in a sewer system. The outlet 170 is usually positioned at a point on the interior wall 120 above the level of the inlets 90. The pumps 140 are affixed to the lift station base 130 and submerged in wastewater 20. A float 180 in the lift station 30, preferably suspended from the top of the station 30, has designated points at which it turns the pumps 140 on and off; these points are usually in the range of one-to-four feet apart.

Once introduced into the piping 40 at the input end 70, the wastewater 20 passes through the piping 40 and is discharged from the apparatus 10, via the discharge end 80, along the interior wall 120. This directional discharge will cause the wastewater 20 to flow in a generally circular or vortex-like direction 190 in the lift station 30. This flow direction 190 will keep moving any solids 150 which are in the lift station 30, thereby reducing the tendency of the solids 150 to separate from the wastewater 20, float, and coagulate. In turn, the increased mixing of the solids 150 with the circulating 190 wastewater allows the pumps 140 to remove more of the solids 150 from the lift station 30, which reduces the build-up of solids 150 and the need for the expensive and unpleasant task of cleaning the lift station 30. Advantageously, the wastewater's rotational direction 190 caused by the apparatus 10 will help prevent the wastewater 20 from freezing in the lift station 30.

In one embodiment of the apparatus 10, the piping 40 and basin 100 are composed of stainless steel, but numerous other materials, such as plastic (including the common thermoplastic polyvinyl chloride, or "PVC") and fiberglass, are contemplated. The piping 40 and basin 100 are fastened to the interior wall 120 of the lift station 30 by means known in the plumbing art, such as bolts 200 and strapping, adhesives (epoxy or spray), or a combination thereof. The piping 40 may vary in diameter, with no particular limitation, and the frequently-encountered pipes in the eight-to-twelve inch diameter range may be employed by the present invention. Further, the piping 40 may be one continuous element or multiple pieces of pipe joined in one of the manners known in the pipe fitting art, such as by welding, soldering, fastening members, or the use of a joint compound.

Whether a continuous piece of pipe or separate members including an "elbow" fitting, the piping 40 will employ a bend 210 in order to discharge the wastewater 20 in the desired direction. The bend 210 may be any of a number of angles, so long as the non-vertical section 60 of the piping 40 is not vertically oriented. In an illustrative embodiment, the bend 210 is an approximately 90° angle. In another embodiment, a pipe section positioned at an approximately 45° angle connects the generally vertical section 50 of the piping to the generally non-vertical section 60.

In addition, one or more swivels 220 may be incorporated in the piping 40 to permit rotation of the generally non-vertical section 60 around the axis created by the generally vertical section 50. The swivels 220 thus allow the wastewater 20 discharge to be directed to the right or left of a given inlet 90 and create, depending on the direction in which the discharge end 80 of the piping 40 is pointing, a clockwise or counter-clockwise rotation 190 of wastewater 20 in the lift station 30.

The basin 100 into which wastewater 20 from an inlet 90 flows may be a single-piece member or assembled from multiple members, such as pieces of stainless steel. The basin 100 is not limited in size, but may have a width of eighteen-to-twenty-four inches to accommodate the volume of wastewater 20 released by a standard lift station inlet 90, which is typically a pipe having a diameter in the range of six-to-twelve inches. The diameter of the aperture 110 in the basin 100 should correspond to the particular diameter of piping 40 used by the apparatus 10. The basin 100 may be attached to the piping 40 by the same means used to join pieces of the piping 40, such as welding, soldering, or fastening members. The piping 40 in an illustrative embodiment snugly fits in the aperture 110, preventing wastewater 20 in the basin 100 from being conveyed anywhere but to the interior of the piping 40. The basin 100 will preferably have an interior which has a slope 230 facilitating the delivery of wastewater 20 to the aperture 110 and thus into the piping 40. The basin 100 may, but need not, be composed of the same materials as the piping 40, such as stainless steel. To reduce splashing of wastewater 20 outside of the basin 100, the basin 100 may further comprise a cover (not shown) on its top which has an aperture through which wastewater 20 from an inlet 90 may flow into the basin 100.

Additionally, the discharge end 80 of the piping 40 may further comprise an adapter 240 for increasing the force by which the wastewater 20 is discharged from the piping 40. The increase in force is accomplished by a reduction in discharge point diameter: the discharge point 250 of the adapter 240 is smaller than the diameter of the discharge end 80 of the piping 40. The adapter 240 may be affixed to the discharge end 80 of the piping 40 by a variety of means, including adhesive. The adapter 240 may be composed from any number of durable materials and is composed of a flexible rubber in one illustrative embodiment.

Figure 4:
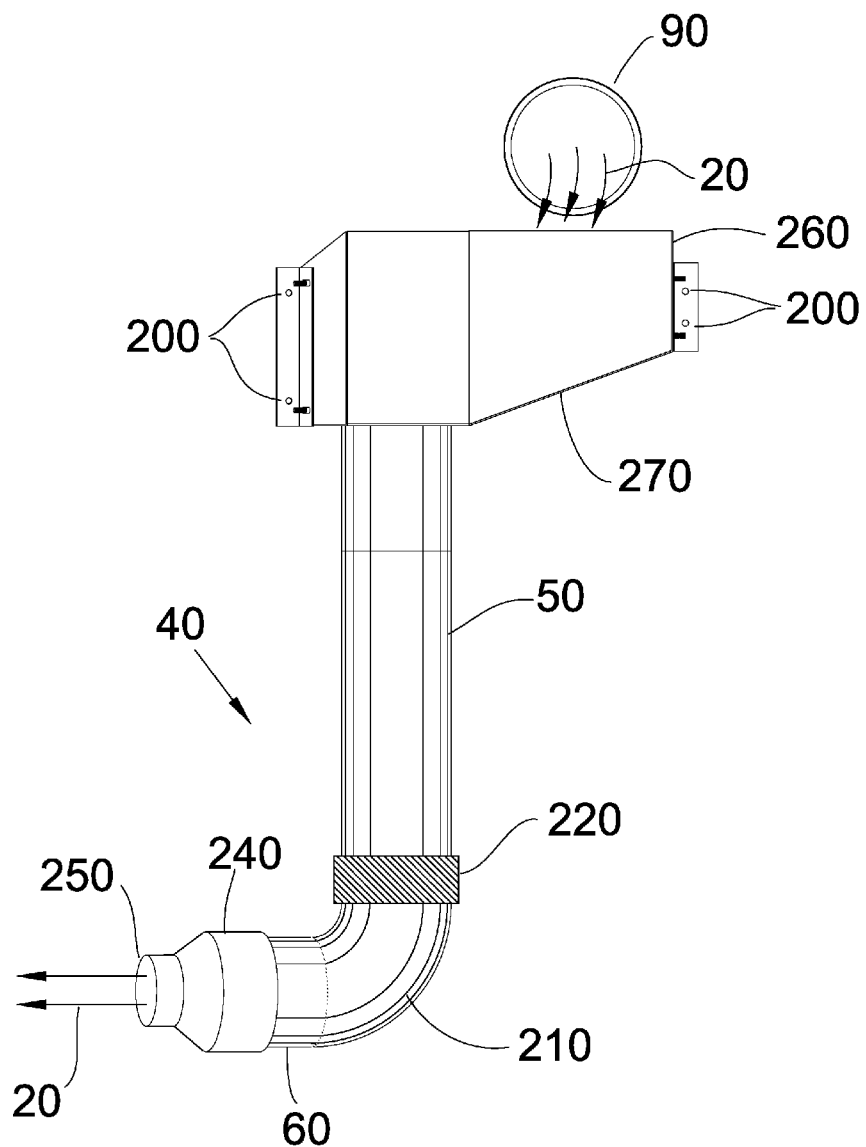
FIG. 4 is a front view of an alternative illustrative embodiment of an apparatus for diverting the flow of wastewater in a lift station.

Referring to FIG. 4, an alternative embodiment of the present invention is shown. In this embodiment, the wastewater 20 received from a lift station inlet 90 is first laterally conveyed by the use of an angled basin 260 or section of piping prior to further conveyance down a generally vertical section 50 and at least one generally non-vertical section 60 of piping 40. This initial lateral conveyance may be accomplished by a fitted pipe piece, an integrated piping section having a bend therein, or use of a basin 260 which has an angled base 270 that forces the wastewater 20 sideways, rather than through an aperture in its base. The adapter 240 can be used in this embodiment as well.

The apparatus 10 may be implemented as part of a method for diverting the flow of wastewater in a lift station. The method begins with the step of providing a lift station 30 or other storage tank having one or more inlets 90 and an interior wall 120. The method continues with the step of providing an apparatus 10, comprising piping 40 affixed to the lift station's interior wall 120 and having an input end 70, at least one generally vertical section 50, at least one generally non-vertical section 60 culminating in a discharge end 80. The input end 70 of the piping 40 is coupled to an inlet 90 or otherwise configured to receive wastewater 20 introduced into the lift station 30 by one or more of the inlets 90 and is positioned to discharge the wastewater 20 from the discharge end 80. The method further comprises the step of introducing wastewater 20 into the lift station 30 by one or more of the inlets 90, whereby the wastewater 20 is conveyed through the piping 40 and discharged from the apparatus 10, via the generally non-vertical section 60, along the interior wall 120, causing the wastewater 20 to flow in a generally circular or vortex-like direction 190 in the lift station 30.

Due to the minimal number of components, the present apparatus 10 allows for easy retrofitting to existing lift stations 30. Further the apparatus 10 could be integrated in a new lift station 30 at the point of station manufacture. The apparatus 10 and method disclosed herein may also be applied to virtually any sort of wet well or liquid holding tank, not just one designed for waste collection and conveyance, or any access chamber, such as a manhole.

While the invention has been illustrated and described in detail in the foregoing drawings and description, the same is to be considered as illustrative and not restrictive in character, it being understood that only illustrative embodiments thereof have been shown and described and that all changes and modifications which are within the scope of the claimed subject matter are desired to be protected.

What is claimed is:

1. A lift station assembly, comprising:
   a lift station having an interior wall that defines a reservoir, the reservoir configured to contain wastewater therein at or below a fluid height;
   an inlet and an outlet defined in the interior wall of the lift station, the inlet and outlet disposed at a location above the fluid height of the reservoir;
   a pump coupled positioned in the reservoir, the pump having a pump outlet for transferring wastewater from the reservoir to the outlet;
   a flow diverting apparatus coupled to the interior wall of the lift station, the apparatus including:
      a basin comprising a top portion and a lower portion, the top portion having an open top end spaced from and positioned at a location below the inlet so that wastewater flowing through the inlet is received by the basin through its open top end of the top portion, and the lower portion having a tapered cross-section, the tapered cross-section having its maximum width nearest the top portion;
      a first pipe section coupled to the lower portion of the basin, the first pipe section being oriented vertically within the reservoir so that wastewater passes therethrough in a first direction;
      a second pipe section having a discharge end, the second pipe section being disposed within the reservoir and fluidly coupled to the first pipe section, where wastewater flows through the second pipe section in a second direction and exits the second pipe section through the discharge end, the first direction being substantially perpendicular to the second direction; and
      a third pipe section coupled between the first pipe section and the second pipe section, the third pipe section forming a bend;
   wherein, the flow diverting apparatus is coupled to the interior wall above the fluid height;
   further wherein, the first pipe section defines a pivot axis, and the second pipe section and third pipe section are pivotably coupled to the first pipe section to allow the discharge end to pivot with respect to the pivot axis to discharge wastewater into the reservoir at any direction.

2. The assembly of claim 1, wherein the second pipe section is generally horizontal in orientation.

3. The assembly of claim 1, wherein one of the first pipe section, the second pipe section, and the third pipe section is coupled to the interior wall.

4. The assembly of claim 1, further comprising an adapter having a first end and a second end, the first end being coupled to the discharge end of the second pipe section, wherein the first end has a larger cross-section than the second end.

5. The assembly of claim 1, wherein the second pipe section is positioned at least partially parallel to the interior wall so as to create a vortex-like flow of wastewater in the reservoir.

6. The assembly of claim 1, wherein the basin is disposed directly beneath and spaced from the inlet.

7. The assembly of claim 1, wherein the top portion of the basin is directly coupled to the inlet.

8. The assembly of claim 1, further comprising one or more swivels in one of the first, second, or third pipe section.

9. The assembly of claim 1, further comprising a second inlet defined in the interior wall for introducing wastewater into the reservoir, the second inlet not being fluidly coupled to the flow diverting apparatus.

10. The assembly of claim 9, further comprising a second flow diverting apparatus, the second flow diverting apparatus having a second basin with an open top end that is spaced from and disposed below the second inlet.

11. The assembly of claim 1, wherein the flow diverting apparatus is always maintained at a position above the fluid height.

12. A lift station assembly, comprising:
   a lift station having an interior wall that defines a reservoir, the reservoir configured to store wastewater therein at or below a fluid height;
   a first inlet, a second inlet, and an outlet defined in the interior wall of the lift station, the first and second inlets and the outlet disposed at a location above the fluid height of the reservoir;
   a pump coupled positioned in the reservoir, the pump having a pump outlet for transferring wastewater from the reservoir to the outlet;
   a flow diverting apparatus coupled to the interior wall of the lift station, the apparatus including:
      a basin comprising a top portion and a lower portion, the top portion having an open top end spaced from and positioned at a location below the first inlet so that wastewater flowing through the inlet is received by the basin through its open top end of the top portion, and the lower portion having a tapered cross-section, the tapered cross-section having its maximum width nearest the top portion;
      a first pipe section coupled to the lower portion of the basin, the first pipe section being oriented vertically within the reservoir so that wastewater passes therethrough in a first direction;
      a second pipe section having a discharge end, the second pipe section being disposed within the reservoir and fluidly coupled to the first pipe section, where wastewater flows through the second pipe section in a second direction and exits the second pipe section through the discharge end, the first direction being substantially perpendicular to the second direction; and a third pipe section coupled between the first pipe section and the second pipe section, the third pipe section forming a bend;

wherein, the flow diverting apparatus is coupled to the interior wall above the fluid height;

further wherein, the second inlet is not fluidly coupled with the flow diverting apparatus.

13. The assembly of claim 12, wherein the second pipe section is generally horizontal in orientation.

14. The assembly of claim 12, wherein one of the first pipe section, the second pipe section, and the third pipe section is coupled to the interior wall.

15. The assembly of claim 12, further comprising an adapter having a first end and a second end, the first end being coupled to the discharge end of the second pipe section, wherein the first end has a larger cross-section than the second end.

16. The assembly of claim 12, wherein the second pipe section is positioned at least partially parallel to the interior wall so as to create a vortex-like flow of wastewater in the reservoir.

17. The assembly of claim 12, wherein the basin is disposed directly beneath and spaced from the inlet.

18. The assembly of claim 12, wherein the top portion of the basin is directly coupled to the inlet.

19. The assembly of claim 12, further comprising one or more swivels in one of the first, second, or third pipe section.

20. The assembly of claim 12, wherein the flow diverting apparatus is always maintained at a position above the fluid height.

* * * * *